Figure 1:
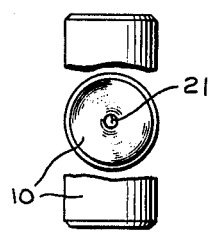

May 10, 1966     W. J. FANNING     3,250,969

ENCAPSULATED CAPACITOR

Filed July 29, 1964

INVENTOR
W. J. FANNING
BY A.C. Schwarz, Jr.
ATTORNEY

United States Patent Office 3,250,969
Patented May 10, 1966

3,250,969
ENCAPSULATED CAPACITOR
William J. Fanning, Melrose Park, Ill., assignor to Western Electric Company, Incorporated, New York, N.Y., a corporation of New York
Filed July 29, 1964, Ser. No. 386,014
2 Claims. (Cl. 317—242)

The present invention relates generally to an encapsulated element, and more particularly to an encapsulated capacitor. The general object of the invention is to provide a new and improved capacitor of such character.

In the encapsulation of certain elements, it is often necessary that a substantially rigid, virtually impregnable protective seal be provided about the element. Newly developed heat shrinkable plastics and other covering materials have found great utility in this area, but such materials are generally quite expensive and require special encapsulation techniques and equipment. A further disadvantage of such plastics and other materials is that the resulting protective covering is generally soft and pliable, and hence is insufficiently rigid to resist deformation in certain applications.

Accordingly, it is an object of the present invention to provide a new and improved encapsulated element, wherein a substantially rigid protective covering is provided, wherein common everyday equipment may be employed to produce the element, wherein the rigid covering member is performed and yet is capable of compensating for minor variations in the size of the element so that the element is nonetheless held securely therewithin, and wherein the covering materials are relatively inexpensive.

A feature of the present invention accomplishing the advantages of the preceding object involves the provision of a substantially rigid, preformed sleeve for receiving an element, a pair of inwardly directed peripheral beads being formed in the sleeve which collapse upon axial compression of the sleeve and deform inwardly into contact with adjacent peripheral portions of the element. The collapsed beads firmly engage and secure the element within the sleeve, despite minor variations in the size of the element, and the open ends of the sleeve are subsequently sealed to complete the encapsulation of the element.

In the more specialized field of encapsulating electrical components, very stringent requirements must be met. In the fabrication of certain capacitors, for example, not only must a substantially rigid covering be provided to resist deformation, but a moisture seal must also be provided. This presents a more difficult problem because unless the rigid covering member is actually molded about the capacitor in a molten state, it must be preformed with openings to permit insertion of the capacitor body, and these openings must be effectively sealed in a subsequent operation to provide a moisture barrier. It is the problem of sealing such openings that has forced the transition to the more expensive encapsulating techniques utilizing heat shrinkable plastics and other similar materials.

It is therefore another object of the invention to provide a new and improved encapsulated capacitor, wherein a rigid covering member and an effective moisture seal are provided, wherein the covering member may be preformed and the openings therein effectively sealed, and wherein the overall encapsulating operation is relatively simple and inexpensive.

The advantages of the above object are accomplished in accordance with another feature of the invention by a method of encapsulation in which a capacitor is inserted in a preformed metal sleeve of like configuration having a pair of inwardly directed, peripheral beads formed therein and axially spaced apart a distance less than the length of the capacitor body. The sleeve is then axially compressed to collapse the beads and force them firmly into contact with adjacent peripheral portions of the capacitor body. The open ends of the sleeve are subsequently sealed by filling each end with a sealing compound which penetrates to the exposed portion of the collapsed beads between the sleeve and the capacitor body and solidifies about the ends of the capacitor body to form an effective moisture barrier.

It is a further object of the invention to provide a new and improved capacitor wherein the capacitor is provided with a substantially rigid covering member to resist deformation and a tight seal to resist moisture penetration.

In accordance with a preferred embodiment of the invention, the new and improved encapsulated capacitor is manufactured in the following manner. A capacitor body is formed by winding alternate conductive webs, separated by a dielectric web, in offset relationship about an arbor so that the alternate conductive webs are each exposed at an opposite end of the capacitor body, and so that the dielectric web forms the outermost convolution of the wound capacitor body. The wound capacitor body is then encapsulated in accordance with the method of encapsulating capacitors set forth above, leads being attached either prior to insertion of the capacitor body into the metal sleeve, or prior to the end sealing operation. The sealing compound solidifies about the ends of the capacitor body and the heads on the leads to secure and seal the capacitor body.

Figure 2:
Figure 3:
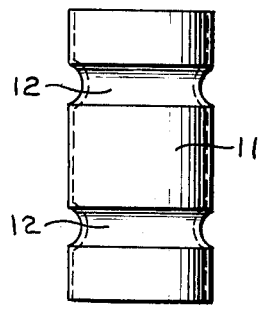
Figure 4:
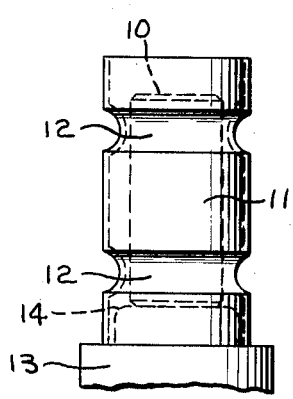
Figure 5:
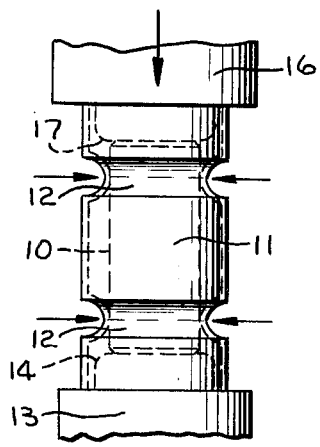
Figure 6:
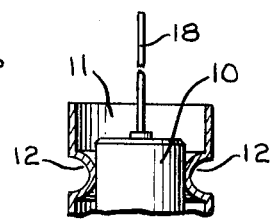
Figure 7:
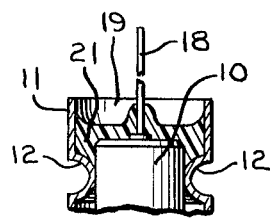
Figure 8:
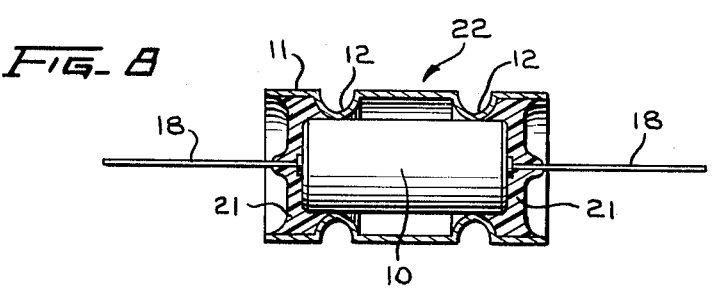

Other objects, advantages and aspects of the invention will become apparent from the following detailed description of a specific embodiment thereof, when taken in conjunction with the appended drawing in which:

FIGS. 1 through 7 are illustrative of a method of manufacturing the encapsulated capacitors of this invention, and depict in order the steps sequentially performed therein; more specifically:

FIG. 1 is an elevational view of a wound capacitor body with a cross section superimposed thereon, FIG. 2 is an elevational view of a preformed covering member for the capacitor body, FIG. 3 is an elevational view of the performed covering member with peripheral beads formed therein, FIG. 4 is a fragmentary elevational view depicting the insertion of the capacitor body into the covering member, FIG. 5 is a fragmentary elevational view illustrating the axial compression of the covering member, FIG. 6 is a fragmentary sectional view showing the lead-attaching operation, FIG. 7 is a fragmentary sectional view revealing the end-sealing operation; and FIG. 8 is a cross sectional view of a finished capacitor forming a preferred product of the invention.

Turning now to the drawing and particularly to FIG. 1, a capacitor body 10 is formed by winding alternate dielectric and conductive webs about an arbor (not shown). In the preferred embodiment of the capacitor described herein, alternate layers of the conductive material are offset with respect to each other so that each alternate layer is exposed at an opposite end of the capacitor body, and an outermost convolution of the capacitor body is formed by the dielectric web. This latter requirement is necessary because the capacitor body 10 is to be encapsulated in a tubular metal sleeve 11, shown in FIG. 2; hence, if the outermost convolution were formed by the conductive web, the capacitor obviously would short out to any conductive element in contact with the sleeve 11.

The sleeve 11 may be preformed in any conventional manner to conform to the cross sectional configuration of the capacitor body 10, the cross section and length of the sleeve 11 of course being greater than that of the capacitor body 10. The sleeve 11 is provided with a pair of peripheral beads 12—12 (FIG. 3) with conventional bead-rolling apparatus so that the beads are spaced axially apart a distance less than the length of a capacitor body 10 axially centered within the sleeve 11. The inner diameter defined by the peripheral beads 12—12 is sufficiently large to permit the capacitor body 10 to be inserted within the sleeve 11 as shown in FIG. 4, the sleeve being received on a base 13 over an arbor 14 which projects upwardly into the sleeve so that the capacitor body may rest thereon in axially centered relationship within the sleeve.

As depicted in FIG. 5, a plunger 16 having an arbor 17 which is aligned with and fits within the sleeve 11 is lowered to compress the sleeve axially of itself, thereby to collapse the beads 12—12 radially inwardly. Because the capacitor body 10 is formed of several tightly wound layers, it is perfectly rigid and cannot be deformed by the collapsing of the thin-walled beads 12—12; consequently, the beads 12—12 deform into contact with the capacitor body 10 and then along the outer surface thereof until the compressive force is terminated. The depth of the beads 12—12 and the compressive force exerted by the plunger 16 are controlled so that the beads 12—12 are deformed to a degree sufficient to compensate automatically for minor variations in the size and shape of the capacitor body 10, and to establish substantial surface contact with the capacitor body 10—a very advantageous feature of the present method.

The plunger 16 is retracted and the sleeve 11, and the capacitor body 10 confined therein, then removed from the arbor 14 so that leads may be attached and the open ends of the sleeve filled with a sealing compound. Any of the conventional techniques may be employed to solder leads 18—18 (FIG. 6) to both ends of the capacitor body 10, and the lead-attaching operation may precede or succeed the confinement of the capacitor body 10 within the sleeve 11. As shown by the sequence of steps in FIGS. 1 through 7, it is preferred that the leads 18—18 be attached immediately after the confinement of the capacitor body 10 within the sleeve 11, because the capacitor body may be more readily handled by automatic equipment for insertion into the sleeve 11 without leads 18—18 already attached thereto and because the arbors 14 and 17 would otherwise require special reliefs to accommodate the leads 18—18 during the compressing operation.

It is also preferred that an arbor hole 21 (FIG. 1) which remains in the wound capacitor body 10 after the winding operation, be masked or plugged at some stage of the encapsulating operation prior to the lead-attaching and end-sealing operation so that solder or sealing compound cannot penetrate into the hole. A copending application of the same assignee, Serial Number 385,868, filed on July 29, 1964, discloses a simple and very practical technique for plugging such arbor holes permanently; and should be consulted for the details of the plugging operation.

The lead-attaching operation is followed by an end-sealing operation in which both ends of the sleeve 11 are provided with a moisture-proof seal. This is accomplished, as shown in FIG. 7, by filling first one end 19 of the sleeve 11 with a sealing compound 21, preferably an epoxy resin, and allowing the sealing compound to set before the other end is filled. The sealing compound 21 flows about the exposed end of the capacitor body 10 and the head of the lead 18, and penetrates to the exposed portions of the collapsed bead 12 between the sleeve 11 and the capacitor body 10—the capacitor body 10 being held firmly by the collapsed beads 12—12 so that the sealing compound cannot penetrate beyond the collapsed beads. The sealing compound is then allowed to solidify to provide a perfect moisture barrier at the end 19 of the sleeve 11, after which the sleeve 11 is inverted so that the remaining end thereof may be sealed in a like manner.

The resulting capacitor, indicated generally by the numeral 22 in FIG. 8, is thus provided with a substantially rigid covering member in the form of the metal sleeve 11 and a perfect moisture barrier in the form of the end seals 21—21. The technique employed to obtain this moisture barrier represents another important feature of the encapsulated capacitor of this invention in that it is the result of the combined effects of collapsing the bead 12 firmly into contact with the capacitor body 10 and causing the sealing compound to penetrate between the sleeve 11 and the capacitor body 10 to the exposed portions of the collapsed bead where it is then allowed to solidify.

There has been disclosed herein a new and improved encapsulated capacitor wherein the capacitor is provided with a substantially rigid covering member to resist deformation and a tight seal to resist moisture penetration. Furthermore, the described process may be altered to provide for the encapsulation of capacitors already formed and having attached leads, in which case the capacitor is inserted in a sleeve 11 of the above design, the sleeve axially compressed, and the ends sealed as before to provide a moisture barrier as well as a rigid protective covering for the capacitor.

Thus, while one specific embodiment is disclosed in detail hereinabove, it is apparent that various modifications may be made without departing from the spirit and the scope of the invention, and it is intended that all such modifications be interpreted as contemplated by the invention.

What is claimed is:
1. A moisture-proof capacitor comprising:
    a body portion formed of alternate layers of dielectric and conductive materials, alternate conductive layers of the body portion being offset with respect to each other so that each is exposed at an opposite end of the body portion, and the outermost layer of the body portion being composed of the dielectric material;
    a metal sleeve fitting over the body portion and having a pair of axially spaced peripheral beads collapsed into firm engagement with adjacent peripheral portions of the body portion to confine the same within the sleeve, the sleeve being of greater length than the body portion;
    a pair of leads, each soldered to an opposite end of the body portion in electrical contact therewith; and
    an end seal formed at both ends of the sleeve by a sealing compound which has penetrated to and solidified about the exposed portion of the collapsed peripheral beads between the sleeve and the body portion, as well as about the exposed ends of the body portion and attached leads, to form a tight seal.
2. A moisture-proof capacitor comprising:
    a body portion formed of alternate layers of dielectric and conductive materials, alternate conductive layers of the body portion being exposed at an opposite end of the body portion, and the outermost layer of the body portion being composed of the dielectric material;
    a metal sleeve fitting over the body portion and having at least a pair of axially spaced peripheral beads collapsed into firm engagement with adjacent peripheral portions of the body portion near opposite ends of the body portion to confine the same within the sleeve, the sleeve being of greater length than the body portion;

a pair of leads, each attached to an opposite end of the body portion in electrical contact therewith; and an end seal formed at both ends of the sleeve by a sealing compound which has penetrated to and solidified about the exposed portion of the aforementioned pair of collapsed peripheral beads between the sleeve and the body portion, as well as about the exposed ends of the body portion and attached leads, to form a tight seal.

References Cited by the Examiner

UNITED STATES PATENTS

| | | | |
|---|---|---|---|
| 2,029,430 | 2/1936 | Kopiwski | 317—260 |
| 2,596,134 | 5/1952 | Dorst | 174—52.6 |
| 2,891,362 | 6/1959 | Bettridge | 264—272 |
| 3,204,164 | 9/1965 | Burke | 317—260 |

ROBERT K. SCHAEFER, *Primary Examiner.*

E. GOLDBERG, *Assistant Examiner.*